United States Patent
Sasaki

(10) Patent No.: US 10,112,579 B2
(45) Date of Patent: Oct. 30, 2018

(54) VEHICLE ANTITHEFT SYSTEM AND VEHICLE SECURITY DEVICE

(71) Applicant: TOYOTA JIDOSHA KABUSHIKI KAISHA, Toyota-shi, Aichi-ken (JP)

(72) Inventor: Hajime Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/451,936

(22) Filed: Mar. 7, 2017

(65) Prior Publication Data

US 2017/0259784 A1    Sep. 14, 2017

(30) Foreign Application Priority Data

Mar. 14, 2016 (JP) .................. 2016-049928

(51) Int. Cl.
  *B60R 25/20* (2013.01)
  *B60R 25/10* (2013.01)
  *G08B 13/00* (2006.01)

(52) U.S. Cl.
  CPC .............. *B60R 25/20* (2013.01); *B60R 25/10* (2013.01); *G08B 13/00* (2013.01)

(58) Field of Classification Search
  CPC .......... B60R 25/20; B60R 25/10; G08B 13/00
  See application file for complete search history.

(56) References Cited

U.S. PATENT DOCUMENTS

| | | | |
|---|---|---|---|
| 6,525,643 B1 | 2/2003 | Okada et al. | |
| 2004/0017292 A1* | 1/2004 | Reese | G08B 25/008 340/539.1 |
| 2004/0215750 A1* | 10/2004 | Stilp | G06K 7/0008 709/220 |
| 2005/0122208 A1* | 6/2005 | Kondo | B60R 1/04 340/5.22 |
| 2005/0128068 A1* | 6/2005 | Winick | B60R 25/1004 340/517 |
| 2005/0162260 A1* | 7/2005 | Gupte | B60R 25/1004 340/426.18 |
| 2008/0055050 A1* | 3/2008 | Brown | B60R 25/00 340/10.41 |

(Continued)

FOREIGN PATENT DOCUMENTS

| | | |
|---|---|---|
| JP | H11-245768 A | 9/1999 |
| JP | 2010-042754 A | 2/2010 |
| JP | 2012-011876 A | 1/2012 |

*Primary Examiner* — Erin F Heard
(74) *Attorney, Agent, or Firm* — Oliff PLC

(57) ABSTRACT

A vehicle antitheft system includes a house security device and a vehicle security device. The house security device includes a detection unit and a transmission unit configured to transmit a notification when a state change of a predetermined security unit is detected by the detection unit. The vehicle security device includes a reception unit configured to receive the notification transmitted from the transmission unit and a function control unit configured to control a vehicle antitheft function depending on whether the notification is received by the reception unit. The function control unit is configured to release the vehicle antitheft function when the notification is not received and a regular vehicle key is used to operate a vehicle, and to restrict releasing of the vehicle antitheft function when the notification is received and the regular vehicle key is used to operate the vehicle.

10 Claims, 11 Drawing Sheets

(56) References Cited

U.S. PATENT DOCUMENTS

| | | | |
|---|---|---|---|
| 2008/0057929 A1* | 3/2008 | Min | G08C 17/02 |
| | | | 455/418 |
| 2009/0022317 A1* | 1/2009 | Akima | B60R 25/04 |
| | | | 380/277 |
| 2009/0322535 A1* | 12/2009 | Shin | B60R 25/1012 |
| | | | 340/572.1 |
| 2010/0305779 A1* | 12/2010 | Hassan | G01C 17/38 |
| | | | 701/2 |
| 2011/0248866 A1* | 10/2011 | Chutorash | G08C 17/00 |
| | | | 340/901 |
| 2012/0169487 A1* | 7/2012 | Poder | B60R 25/102 |
| | | | 340/426.15 |
| 2012/0235803 A1* | 9/2012 | Bunting | B60R 25/1004 |
| | | | 340/426.27 |
| 2013/0091907 A1 | 4/2013 | Nishijima et al. | |
| 2015/0005986 A1* | 1/2015 | Kantajaraniti | B60R 25/066 |
| | | | 701/2 |
| 2016/0335879 A1* | 11/2016 | Carr | G08B 25/006 |

* cited by examiner

VEHICLE ANTITHEFT SYSTEM AND VEHICLE SECURITY DEVICE

INCORPORATION BY REFERENCE

The disclosure of Japanese Patent Application No. 2016-049928 filed on Mar. 14, 2016 including the specification, drawings and abstract is incorporated herein by reference in its entirety.

BACKGROUND

1. Technical Field

The disclosure relates to a vehicle antitheft system and a vehicle security device which is used for the system.

2. Description of Related Art

For example, Japanese Patent Application Publication No. 2010-042754 (JP 2010-042754 A) and Japanese Patent Application Publication No. 2012-011876 (JP 2012-011876 A) disclose various measures against vehicle theft using an illegally taken regular vehicle key when a suspicious person such as a thief illegally takes the regular vehicle key (which includes a duplicated vehicle key of the regular vehicle key).

SUMMARY

In the above-mentioned vehicle antitheft systems described in JP 2010-042754 A and JP 2012-011876 A, when an illegally taken regular vehicle key is used, hindrance or prevention of vehicle theft is achieved by sounding an alarm outward from the vehicle or prohibiting starting of an engine of the vehicle.

However, in the above-mentioned vehicle antitheft systems described in JP 2010-042754 A and JP 2012-011876 A, a switch for setting whether to sound an alarm or a switch for setting whether to transmit an engine start prohibiting signal, that is, a switch for activating/stopping the system, is installed in a house. Accordingly, when a suspicious person trespasses into the house and operates the switch to stop the vehicle antitheft system, the vehicle can simply be stolen using the regular vehicle key.

That is, the above-mentioned vehicle antitheft systems described in JP 2010-042754 A and JP 2012-011876 A are not systems that can prevent theft of a vehicle by coordinating security of a house and security of a vehicle.

The disclosure provides a vehicle antitheft system and a vehicle security device that can decrease the possibility of theft of a vehicle by coordinating security of a house and security of a vehicle.

In a first aspect of the disclosure, a vehicle antitheft system includes a house security device and a vehicle security device. The house security device includes a detection unit configured to detect a state change of a predetermined security unit installed in a house, and a transmission unit configured to transmit a notification indicating that the state change is detected when the state change of the predetermined security unit is detected by the detection unit. The vehicle security device includes a reception unit configured to receive the notification transmitted from the transmission unit of the house security device, and a function control unit configured to control a vehicle antitheft function depending on whether the notification is received by the reception unit. The function control unit is configured to release the vehicle antitheft function when the notification is not received by the reception unit and a regular vehicle key is used to operate a vehicle and to restrict releasing of the vehicle antitheft function when the notification is received by the reception unit and the regular vehicle key is used to operate the vehicle.

In the vehicle antitheft system according to the first aspect, the house security device on a house side and the vehicle security device on a vehicle side are configured to communicate with each other. The house security device transmits a notification indicating that an abnormality is detected in the house to the vehicle security device when the abnormality is detected in the house according to the state change of the predetermined security unit (for example, a sensor). The vehicle security device receives the notification and restricts releasing of the vehicle antitheft function when the regular vehicle key is used to operate the vehicle.

By this process, in the vehicle antitheft system according to the first aspect, for example, even in a situation in which a regular vehicle key located in a house is taken by a trespassing suspicious person or the like, the releasing of the vehicle antitheft function is already restricted according to the notification from the house and thus it is possible to decrease the possibility of theft of a vehicle parked in a garage or the like using the taken regular vehicle key.

In the vehicle antitheft system according to the aspect, the vehicle antitheft function may be a function of prohibiting starting of a vehicle engine.

In the above-mentioned configuration, a vehicle engine is controlled not to be started by prohibiting releasing of an engine start prohibited state in which the engine cannot be started using even a regular vehicle key. Accordingly, according to the configuration, even in a situation in which a regular vehicle key located in a house is taken by a trespassing suspicious person or the like, starting of the vehicle engine is already prohibited according to the notification from the house and thus it is possible to decrease the possibility of theft of a vehicle parked in a garage or the like using the taken regular vehicle key.

In the vehicle antitheft system according to the aspect, the vehicle antitheft function may be a function of prohibiting unlocking of a vehicle door by radio communication.

In the above-mentioned configuration, a vehicle door is controlled not to be unlocked by prohibiting releasing of a door unlocking prohibited state in which the door cannot be unlocked using even a regular vehicle key. Accordingly, according to the configuration, even in a situation in which a regular vehicle key located in a house is taken by a trespassing suspicious person or the like, unlocking of the vehicle door is already prohibited according to the notification from the house and it is thus possible to decrease the possibility of theft of a vehicle parked in a garage or the like using the taken regular vehicle key.

In the vehicle antitheft system according to the aspect, the vehicle antitheft function may be a function of sounding an alarm when a vehicle door is unlocked using a mechanical key.

In the above-mentioned configuration, when unlocking of the door using a mechanical key is carried out by inserting a regular vehicle key into a key cylinder of the vehicle, releasing of the door alarm is prohibited and the door alarm is necessarily activated to sound the alarm. Accordingly, according to the configuration, even in a situation in which a regular vehicle key located in a house is taken by a trespassing suspicious person or the like, the releasing of the door alarm of the vehicle is already prohibited by the notification from the house and thus it is possible to decrease the possibility of theft of a vehicle parked in a garage or the like using the taken regular vehicle key.

In the vehicle antitheft system according to the aspect, the house security device may further include an acquisition unit configured to perform searching to find a regular vehicle key located in the house and to acquire identification information of the found regular vehicle key when the state change of the predetermined security unit is detected by the detection unit, the transmission unit of the house security device may be configured to add the identification information of the found regular vehicle key acquired by the acquisition unit to the notification and to transmit the notification to the vehicle security device, and the function control unit of the vehicle security device may be configured to prohibit releasing of the vehicle antitheft function when the notification is received by the reception unit and identification information of a vehicle key used to operate the vehicle matches the identification information included in the notification.

In the above-mentioned configuration, the house security device transmits a notification indicating that an abnormality is detected in the house along with the identification information of the regular vehicle key located in the house to the vehicle security device when the abnormality is detected in the house according to the state change of the security unit. The vehicle security device receives the notification and restricts releasing of the vehicle antitheft function to cases in which the regular vehicle key having the matching identification information is used to operate the vehicle.

Through this process, in the vehicle antitheft system according to the aspect, for example, even in a situation in which a regular vehicle key located in a house is taken by a trespassing suspicious person or the like, the releasing of the vehicle antitheft function is already restricted according to the notification from the house and thus it is possible to decrease the possibility of theft of a vehicle using the taken regular vehicle key while allowing operation of the vehicle using another regular vehicle key which is not taken.

In a second aspect of the disclosure, a vehicle security device that prevents theft of a vehicle based on a notification received from a house security device includes: a reception unit configured to receive the notification indicating that a state change of a predetermined security unit installed in a house is detected from the house security device; and a function control unit configured to control a vehicle antitheft function depending on whether the notification is received by the reception unit. The function control unit is configured to release the vehicle antitheft function when the notification is not received by the reception unit and a regular vehicle key is used to operate a vehicle and to restrict releasing of the vehicle antitheft function when the notification is received by the reception unit and the regular vehicle key is used to operate the vehicle.

In the vehicle security device according to the second aspect, when a notification indicating that an abnormality is detected in the house according to the state change of the security unit (such as a sensor) is received from the house security device on the house side and a regular vehicle key is used to operate the vehicle, releasing of the vehicle antitheft function is restricted.

Through this process, in the vehicle security device according to the second aspect, for example, even in a situation in which a regular vehicle key located in a house is taken by a trespassing suspicious person or the like, the releasing of the vehicle antitheft function has been already restricted by the notification from the house and it is thus possible to decrease the possibility of theft of a vehicle parked in a garage or the like using the taken regular vehicle key.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The disclosure provides a vehicle antitheft system in which a house security device configured to perform security control of a house and a vehicle security device configured to perform security control of a vehicle cooperate with each other. When an abnormality is detected in the house such as trespassing of a suspicious person, the house security device transmits a notification to the vehicle security device. The vehicle security device receives the notification from the house security device and controls the vehicle to be in a state in which theft of the vehicle is not possible or a state in which theft of the vehicle is difficult even when a vehicle key is used to operate the vehicle. Accordingly, even when a regular vehicle key located in a house is taken by a suspicious person or the like, it is possible to decrease the possibility of theft of the vehicle.

First Embodiment

Figure 1:
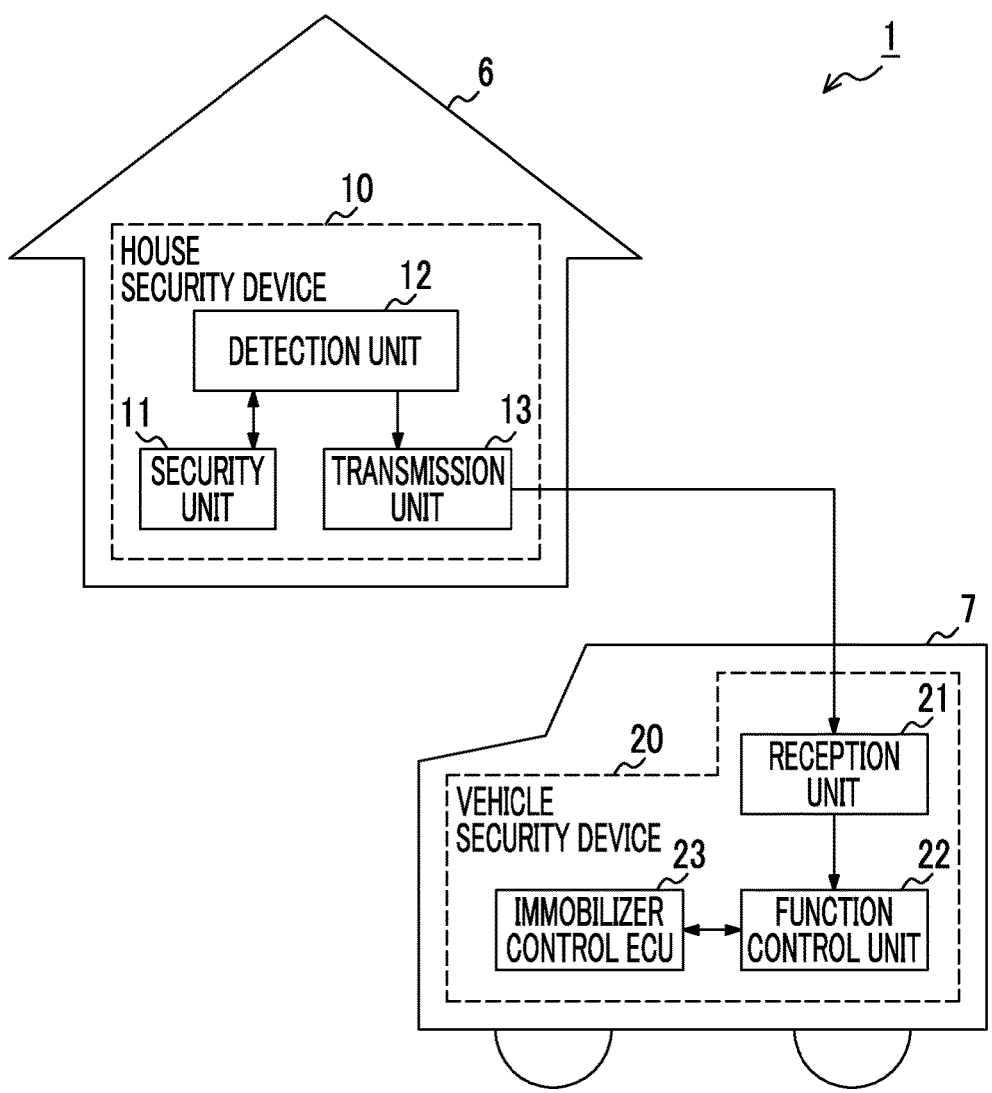
FIG. 1 is a schematic diagram illustrating a configuration of a vehicle antitheft system according to a first embodiment of the disclosure.

A configuration of a vehicle antitheft system according to a first embodiment of the disclosure will be described below. FIG. 1 is a schematic diagram illustrating a configuration of the vehicle antitheft system 1 according to the first embodiment of the disclosure. The vehicle antitheft system 1 illustrated in FIG. 1 includes a house security device 10 and a vehicle security device 20.

The house security device 10 is a device that performs security control of a house 6 and includes a predetermined security unit 11, a detection unit 12, and a transmission unit 13. The security unit 11, the detection unit 12, and the transmission unit 13 are installed in the house 6. The house 6 in this embodiment includes the concept of a site or the like managed by an owner as well as that of a simple residential building.

The security unit 11 is a sensor unit or the like that acquires a condition or state of a predetermined place or household appliance. Examples of the sensor unit include a passive sensor, a radar sensor, or an infrared camera for detecting a trespasser on the site or the building, and an opening sensor, a glass breakage sensor, or a pressure sensor for detecting opening or breakage of a window or a door. The number of security units 11 in the house security device 10 may be one, or two or more.

The detection unit 12 is an example of a detection functional unit included in a house control module that comprehensively performs security control which is performed by the house security device 10. The detection unit 12 is connected to the security unit 11 and can successively receive information on the condition or state from the security unit 11. The detection unit 12 detects that a predetermined change occurs in the condition or state of the security unit 11 on the basis of one or more pieces of information received from the security unit 11. The predetermined change can be arbitrarily determined. For example, the predetermined change may be a change indicating an abnormality in the house 6 in which it can be determined that a suspicious person is trespassing or there is concern that a suspicious person may be trespassing. When a predetermined change in the condition or state of the security unit 11 is detected (which is referred to as "a state change of the security unit 11 is detected"), the detection unit 12 outputs a result indicating that the state change is detected to the transmission unit 13.

The transmission unit 13 is, for example, a transmission functional unit included in a house communication module that communicates with the vehicle security device 20 (the reception unit 21 of the vehicle security device 20). The transmission unit 13 is connected to the detection unit 12 and can receive the result indicating that the state change of the security unit 11 is detected from the detection unit 12. When the result is received from the detection unit 12, the transmission unit 13 transmits a notification indicating that the state change of the security unit 11 is detected (or a notification indicating an abnormality in the house 6) to the vehicle security device 20 (the reception unit 21 of the vehicle security device 20). For example, a known radio communication technique having short signal coverage can be used for the communication between the transmission unit 13 of the house security device 10 and the reception unit 21 of the vehicle security device 20.

The vehicle security device 20 is a device that performs security control of a vehicle 7 and includes a reception unit 21, a function control unit 22, and an immobilizer control electronic control unit (ECU) 23. The reception unit 21, the function control unit 22, and the immobilizer control ECU 23 are mounted on the vehicle 7.

The reception unit 21 is, for example, a reception function unit included in a vehicle communication module that communicates with the house security device 10. The reception unit 21 can receive a notification indicating that a state change of the security unit 11 is detected (or a notification indicating an abnormality in the house 6) transmitted from the transmission unit 13 of the house security device 10. When the notification is received from the house security device 10, the reception unit 21 reports to the function control unit 22 connected thereto that the notification is received.

The function control unit 22 can control the immobilizer control ECU 23 depending on whether the notification indicating that a state change of the security unit 11 is detected (or a notification indicating an abnormality in the house 6) is received from the house security device 10 and can control an antitheft function of the vehicle 7 which is operated by the immobilizer control ECU 23. The function control unit 22 releases the antitheft function of the vehicle 7 which is performed by the immobilizer control ECU 23 when the reception unit 21 does not report that the notification is received and a regular vehicle key is used to operate the vehicle. On the other hand, the function control unit 22 prohibits releasing of the antitheft function of the vehicle 7 which is performed by the immobilizer control ECU 23 when the reception unit 21 reports that the notification is received and a regular vehicle key is used to operate the vehicle.

The immobilizer control ECU 23 is one electronic control unit mounted on the vehicle 7 and performs an antitheft function of the vehicle 7 of prohibiting starting of an engine (not illustrated) of the vehicle 7 unless a regular vehicle key is used to operate the vehicle. The antitheft function normally releases a state in which the engine of the vehicle 7 cannot be started to a state in which the engine can be started when a regular vehicle key is used to operate the vehicle by radio communication. However, in this embodiment, when the notification is received from the house security device 10, the vehicle security device 20 prohibits releasing of the state in which the engine of the vehicle 7 cannot be started even when a regular vehicle key is used to operate the vehicle by radio communication.

Figure 2:
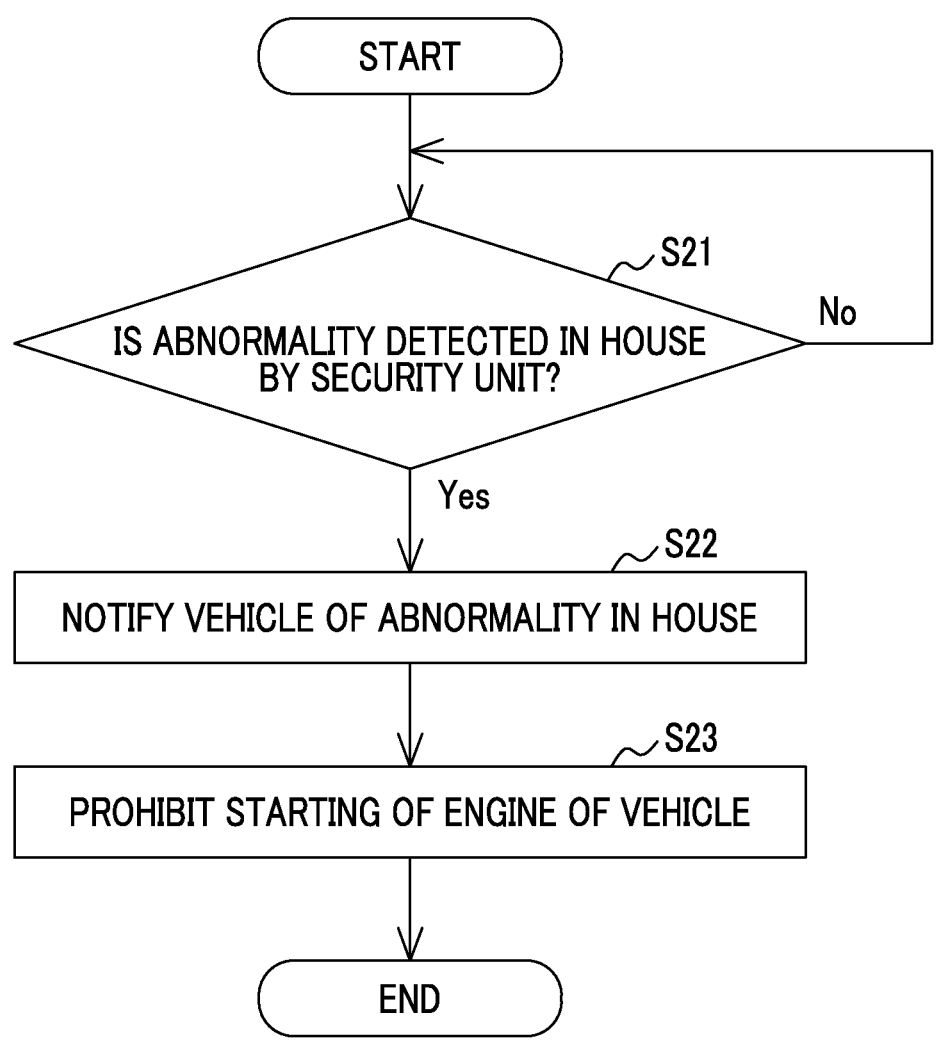
FIG. 2 is a flowchart illustrating a process flow which is performed by the vehicle antitheft system according to the first embodiment.

The vehicle antitheft function which is performed in the vehicle antitheft system 1 according to the first embodiment will be described below with reference to FIG. 2. FIG. 2 is a flowchart illustrating a process flow which is performed by the house security device 10 and the vehicle security device 20.

The process flow illustrated in FIG. 2 is started when the house security device 10 is activated such as when a resident leaves or falls asleep.

When the process flow is started, the detection unit 12 of the house security device 10 determines whether a state change of the security unit 11 is detected, that is, whether an abnormality is detected in the house 6 (Step S21). For example, the detection unit 12 determines that there is a possibility of a suspicious person trespassing into the house via the security unit 11 such as a sensor or a camera.

When it is determined in Step S21 that an abnormality is detected in the house 6, the transmission unit 13 of the house security device 10 transmits a notification indicating that an abnormality is detected in the house 6 to the reception unit 21 of the vehicle security device 20 (the vehicle 7) (Step S22).

In the vehicle security device 20 receiving the notification indicating that an abnormality is detected in the house 6, the function control unit 22 prohibits an action of releasing a state in which the engine of the vehicle 7 cannot be started, that is, prohibits starting of the engine, even when a regular vehicle key is used to operate the vehicle by radio communication, the action being performed by the immobilizer control ECU 23 (Step S23).

Operations and advantages in the first embodiment will be described below. In the vehicle antitheft system 1 according to the first embodiment, the house security device 10 installed in the house 6 and the vehicle security device 20 mounted on the vehicle 7 are configured to communicate with each other. When the state change of the security unit 11 such as a sensor is detected in the house security device 10, that is, when an abnormality is detected in the house 6, the notification indicating that the abnormality is detected is transmitted to the vehicle security device 20. The vehicle security device 20 receiving the notification prohibits releasing of the antitheft function of the vehicle 7 which is normally released when a regular vehicle key is used to operate the vehicle.

Through this process flow, for example, even when a trespassing suspicious person or the like takes a regular vehicle key located in the house 6 and tries to steal the vehicle 7 parked in a garage or the like using the taken regular vehicle key, the releasing of the antitheft function of the vehicle 7 is prohibited according to the notification previously received from the house 6. Particularly, in the first embodiment, the releasing of the engine start prohibited state in which the engine cannot be started using even the regular vehicle key is prohibited to control the engine of the vehicle 7 not to be started.

Accordingly, even in a situation in which a regular vehicle key located in a house 6 is taken by a trespassing suspicious person or the like, it is possible to decrease the possibility of theft of the vehicle 7 by the suspicious person using the taken regular vehicle key.

Figure 3:
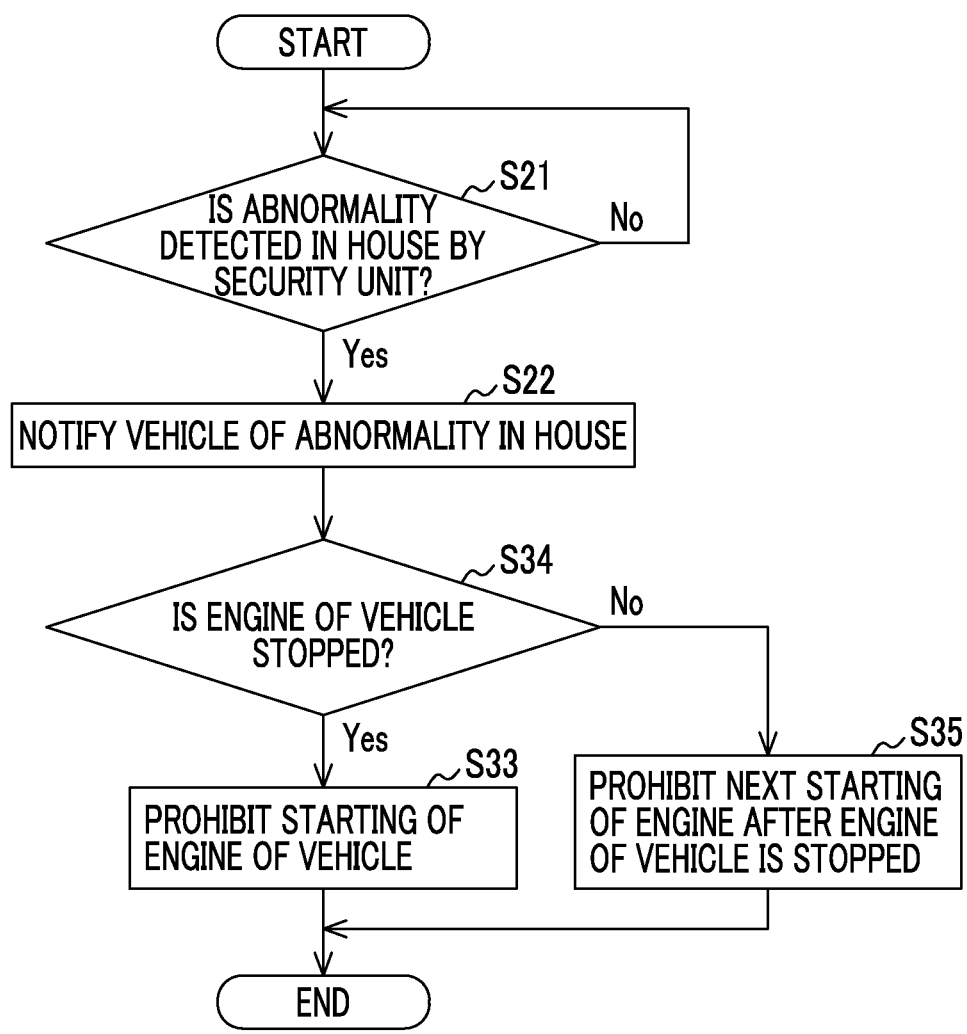
FIG. 3 is a flowchart illustrating a process flow which is performed by a vehicle antitheft system according to a modified example of the first embodiment.

A modified example of the first embodiment will be described below. In the vehicle antitheft process which is performed by the vehicle antitheft system 1, the releasing of the engine start prohibited state is prohibited regardless of the state of the vehicle 7. However, as illustrated in FIG. 3, the timing at which the releasing of the engine start prohibited state is prohibited may be changed depending on the state of the engine. FIG. 3 is a flowchart illustrating a process flow which is performed by the house security device 10 and the vehicle security device 20 according to a modified example.

For example, when the notification indicating that a state change of the security unit 11 of the house security device 10 is detected is received, the vehicle security device 20 determines whether the engine of the vehicle 7 is stopped or started (Step S34). Then, the vehicle security device 20 prohibits the releasing of the engine start prohibited state, that is, prohibits starting of the engine, immediately when the engine of the vehicle 7 is stopped (Step S33), and prohibits releasing of a next engine start prohibited state, that is, prohibits starting of the engine, once the engine is stopped when the engine of the vehicle 7 is started (Step S35).

If the engine of the vehicle 7 is started, it means that the vehicle 7 is used and it is thus considered that the vehicle 7 is not in the vicinity of the house 6 or that a user is close to the vehicle 7. Even when a suspicious person takes a regular vehicle key but the vehicle 7 is not in the vicinity of the house 6 or the user is close to the vehicle 7, the possibility of theft of the vehicle 7 using the taken vehicle key is low. Accordingly, this embodiment is not limited to the above-mentioned configuration, but the releasing of the engine start prohibited state may not be prohibited when the notification is received and the engine of the vehicle 7 is started.

Second Embodiment

Figure 4:
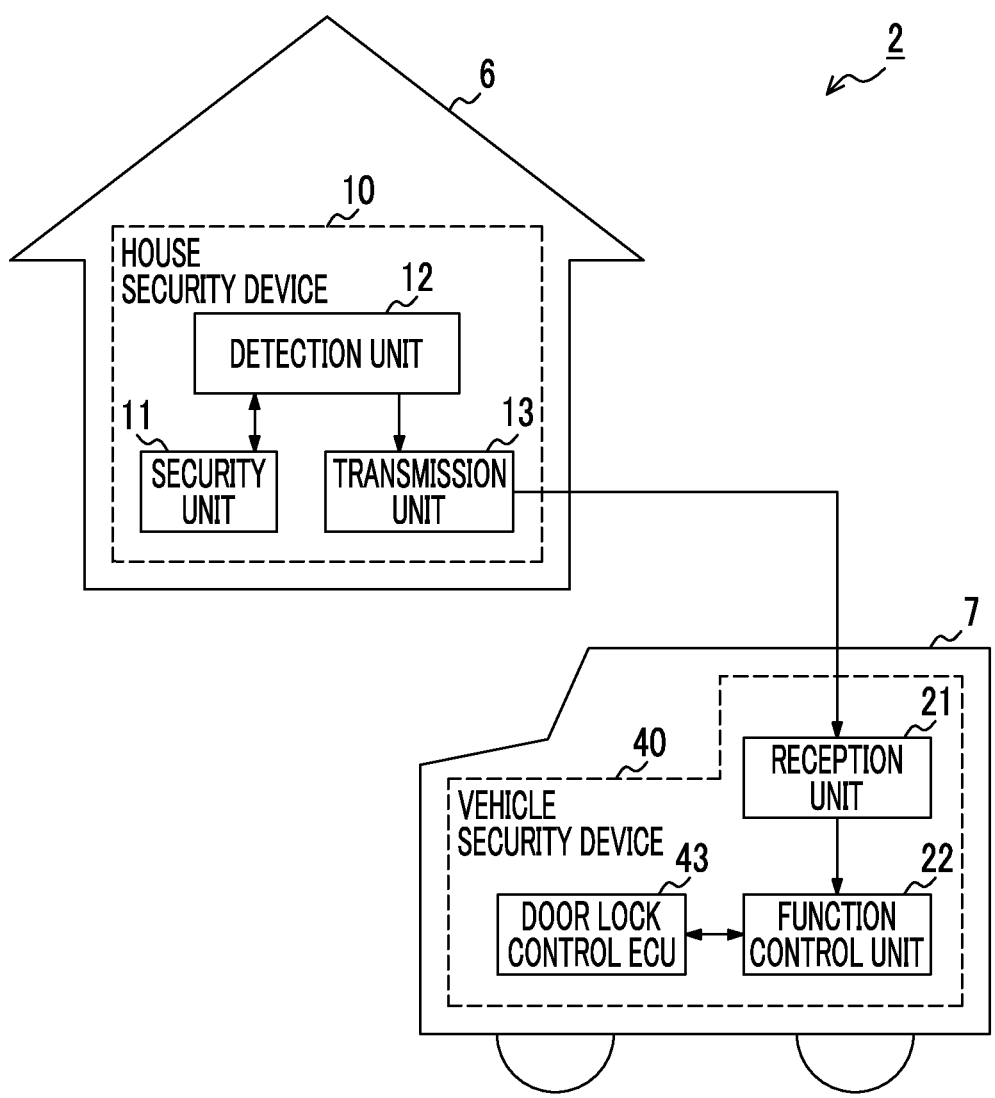
FIG. 4 is a schematic diagram illustrating a configuration of a vehicle antitheft system according to a second embodiment of the disclosure.

A configuration of a vehicle antitheft system according to a second embodiment of the disclosure will be described below. FIG. 4 is a schematic diagram illustrating a configuration of the vehicle antitheft system 2 according to the second embodiment of the disclosure. The vehicle antitheft system 2 illustrated in FIG. 4 includes a house security device 10 and a vehicle security device 40. The vehicle antitheft system 2 according to the second embodiment is different from the vehicle antitheft system 1 according to the first embodiment, in the configuration of the vehicle security device 40.

Some or all of the elements that are the same as those of the vehicle antitheft system 1 will not be repeated and the vehicle antitheft system 2 according to the second embodiment will be described below with focus on the vehicle security device 40 which has a different configuration.

The house security device 10 includes a security unit 11, a detection unit 12, and a transmission unit 13, similarly to the vehicle antitheft system 1 according to the first embodiment. A notification indicating that a state change of the security unit 11 is detected by the detection unit 12 (or a notification indicating an abnormality in the house 6) is transmitted from the transmission unit 13 to the vehicle security device 40 (a reception unit 21 of the vehicle security device 40).

The vehicle security device 40 is a device that performs security control of a vehicle 7 and includes a reception unit 21, a function control unit 22, and a door lock control electronic control unit (ECU) 43. The reception unit 21, the function control unit 22, and the door lock control ECU 43 are mounted on the vehicle 7.

The reception unit 21 is, for example, a reception function unit included in a vehicle communication module that communicates with the house security device 10. The reception unit 21 can receive a notification indicating that a state change of the security unit 11 is detected (or a notification indicating an abnormality in the house 6) transmitted from the transmission unit 13 of the house security device 10. When the notification is received from the house security device 10, the reception unit 21 reports to the function control unit 22 connected thereto that the notification is received.

The function control unit 22 can control the door lock control ECU 43 depending on whether the notification indicating that a state change of the security unit 11 is detected (or a notification indicating an abnormality in the house 6) is received from the house security device 10 and can control an antitheft function of the vehicle 7 which is operated by the door lock control ECU 43. The function control unit 22 releases the antitheft function of the vehicle 7 which is performed by the door lock control ECU 43 when the reception unit 21 does not report that the notification is received and a regular vehicle key is used to operate the vehicle. On the other hand, the function control unit 22 prohibits releasing of the antitheft function of the vehicle 7 which is performed by the door lock control ECU 43 when the reception unit 21 reports that the notification is received and a regular vehicle key is used to operate the vehicle.

The door lock control ECU 43 is one electronic control unit mounted on the vehicle 7 and performs an antitheft function of the vehicle 7 of prohibiting unlocking of a door (not illustrated) of the vehicle 7 unless a regular vehicle key is used to operate the vehicle. The antitheft function normally releases a state in which the door of the vehicle 7 cannot be unlocked to a state in which the door can be unlocked when a regular vehicle key is used to operate the vehicle by radio communication. However, in this embodiment, when the notification is received from the house security device 10, the vehicle security device 40 prohibits releasing of the state in which the door of the vehicle 7 cannot be unlocked even when a regular vehicle key is used to operate the vehicle by radio communication.

Figure 5:
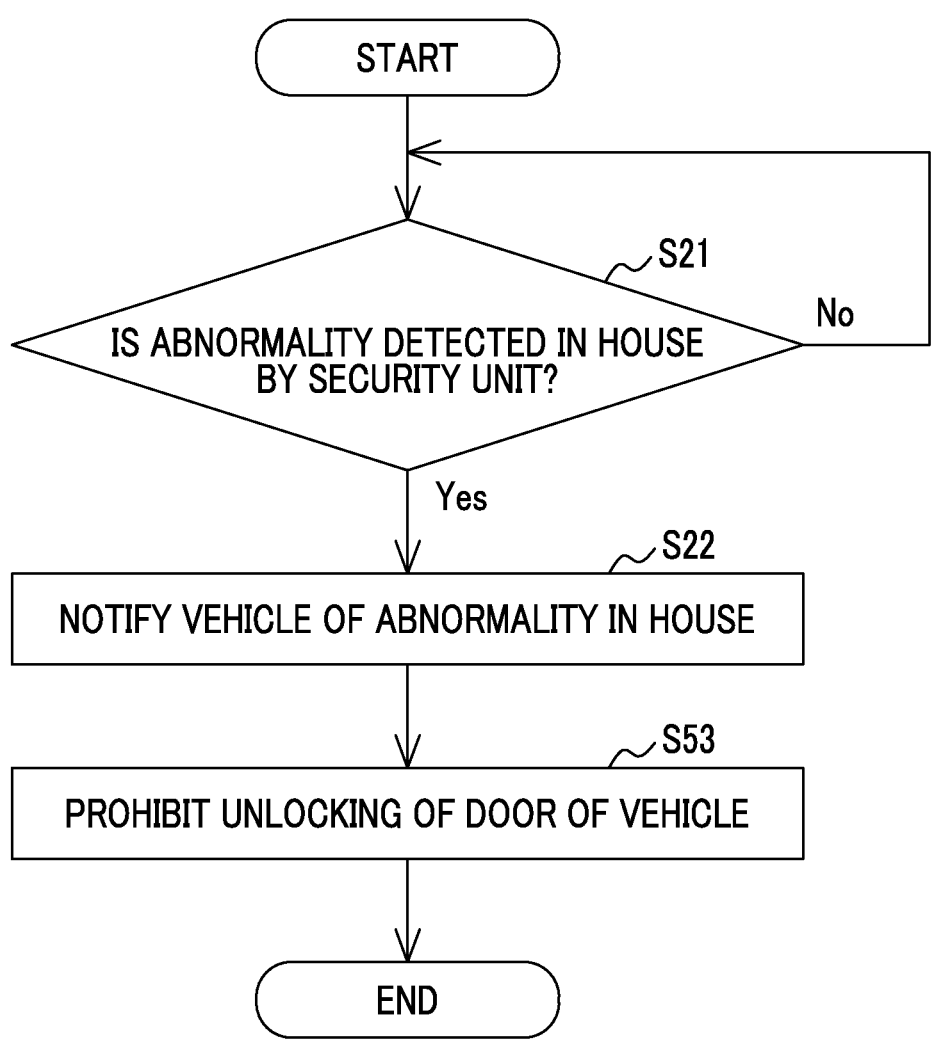
FIG. 5 is a flowchart illustrating a process flow which is performed by the vehicle antitheft system according to the second embodiment.

The vehicle antitheft function which is performed in the vehicle antitheft system 2 according to the second embodiment will be described below with reference to FIG. 5. FIG. 5 is a flowchart illustrating a process flow which is performed by the house security device 10 and the vehicle security device 40.

The process flow illustrated in FIG. 5 is started when the house security device 10 is activated such as when a resident leaves or falls asleep.

When the process flow is started, the detection unit 12 of the house security device 10 determines whether a state change of the security unit 11 is detected, that is, whether an abnormality is detected in the house 6 (Step S21). For example, the detection unit 12 determines that there is a possibility of a suspicious person trespassing into the house via the security unit 11 such as a sensor or a camera.

When it is determined in Step S21 that an abnormality is detected in the house 6, the transmission unit 13 of the house security device 10 transmits a notification indicating that an abnormality is detected in the house 6 to the reception unit 21 of the vehicle security device 40 (the vehicle 7) (Step S22).

In the vehicle security device 40 receiving the notification indicating that an abnormality is detected in the house 6, the function control unit 22 prohibits an action of releasing a state in which the door of the vehicle 7 cannot be unlocked, that is, prohibits unlocking of the door, the action being performed by the door lock control ECU 43, even when a regular vehicle key is used to operate the vehicle by radio communication (Step S53).

Operations and advantages in the second embodiment will be described below. In the vehicle antitheft system 2 according to the second embodiment, the house security device 10 installed in the house 6 and the vehicle security device 40 mounted on the vehicle 7 are configured to communicate with each other. When the state change of the security unit 11 such as a sensor is detected in the house security device 10, that is, when an abnormality is detected in the house 6, the notification indicating that the abnormality is detected is transmitted to the vehicle security device 40. The vehicle security device 40 receiving the notification prohibits releasing of the antitheft function of the vehicle 7 which is normally released when a regular vehicle key is used to operate the vehicle.

Through this process flow, for example, even when a trespassing suspicious person takes a regular vehicle key located in the house 6 and tries to steal the vehicle 7 parked in a garage or the like using the taken regular vehicle key, the releasing of the antitheft function of the vehicle 7 is prohibited according to the notification previously received from the house 6. Particularly, in the second embodiment, the releasing of the state in which the door cannot be unlocked using even the regular vehicle key (unlocking of the door is impossible C) is prohibited to control the door of the vehicle 7 not to be unlocked.

Accordingly, even in a situation in which a regular vehicle key located in a house 6 is taken by a trespassing suspicious person or the like, it is possible to decrease the possibility of theft of the vehicle 7 by the suspicious person using the taken regular vehicle key.

Figure 6:
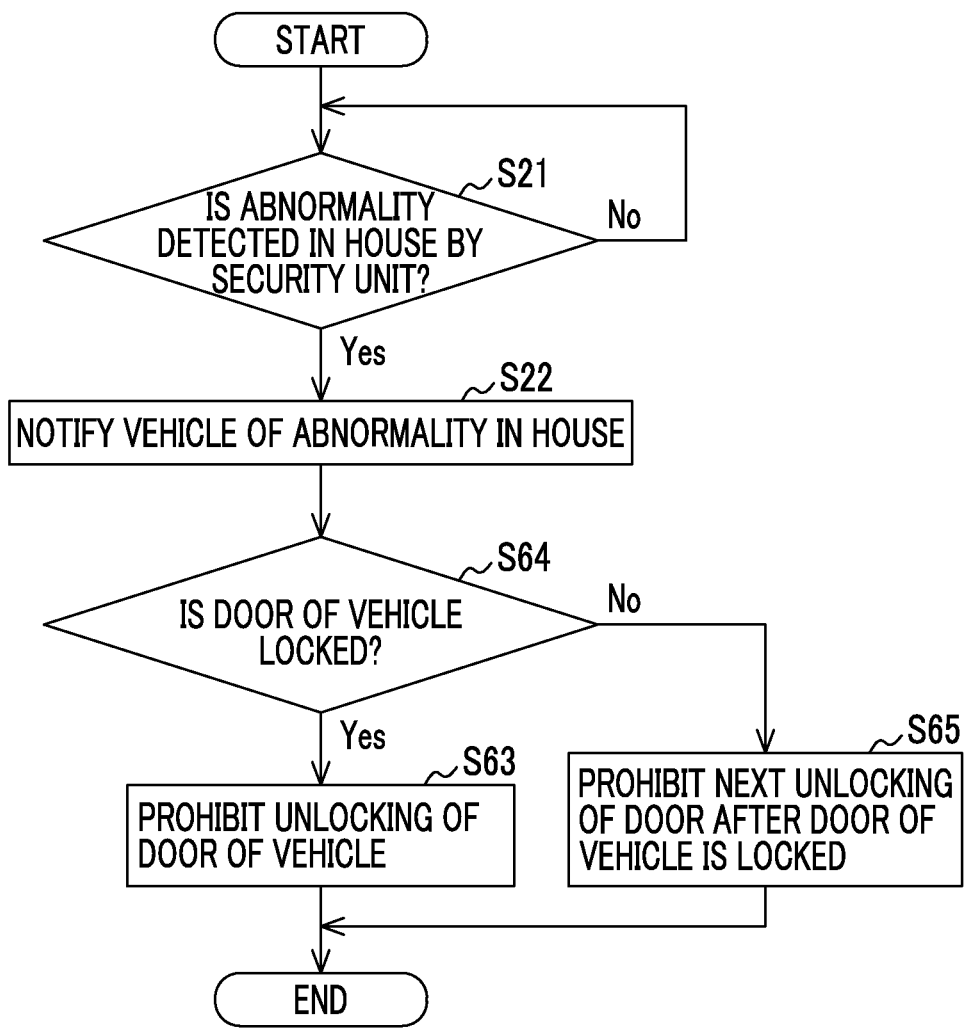
FIG. 6 is a flowchart illustrating a process flow which is performed by a vehicle antitheft system according to a modified example of the second embodiment.

A modified example of the second embodiment will be described below. In the vehicle antitheft process which is performed by the vehicle antitheft system 2, the releasing of the door unlocking prohibited state is prohibited regardless of the state of the vehicle 7. However, as illustrated in FIG. 6, the timing at which the releasing of the door unlocking prohibited state is prohibited may be changed depending on the state of the door. FIG. 6 is a flowchart illustrating a process flow which is performed by the house security device 10 and the vehicle security device 40 according to a modified example.

For example, when the notification indicating that a state change of the security unit 11 of the house security device 10 is detected is received, the vehicle security device 40 determines whether the door of the vehicle 7 is locked (Step S64). Then, the vehicle security device 40 prohibits the releasing of the door unlocking prohibited state, that is, prohibits unlocking of the door, immediately when the door of the vehicle 7 is locked (Step S63), and when the door of the vehicle 7 is unlocked, prohibits releasing of a next door unlocking prohibited state, that is, prohibits unlocking of the door, once the door is locked (Step S65).

Third Embodiment

Figure 7:
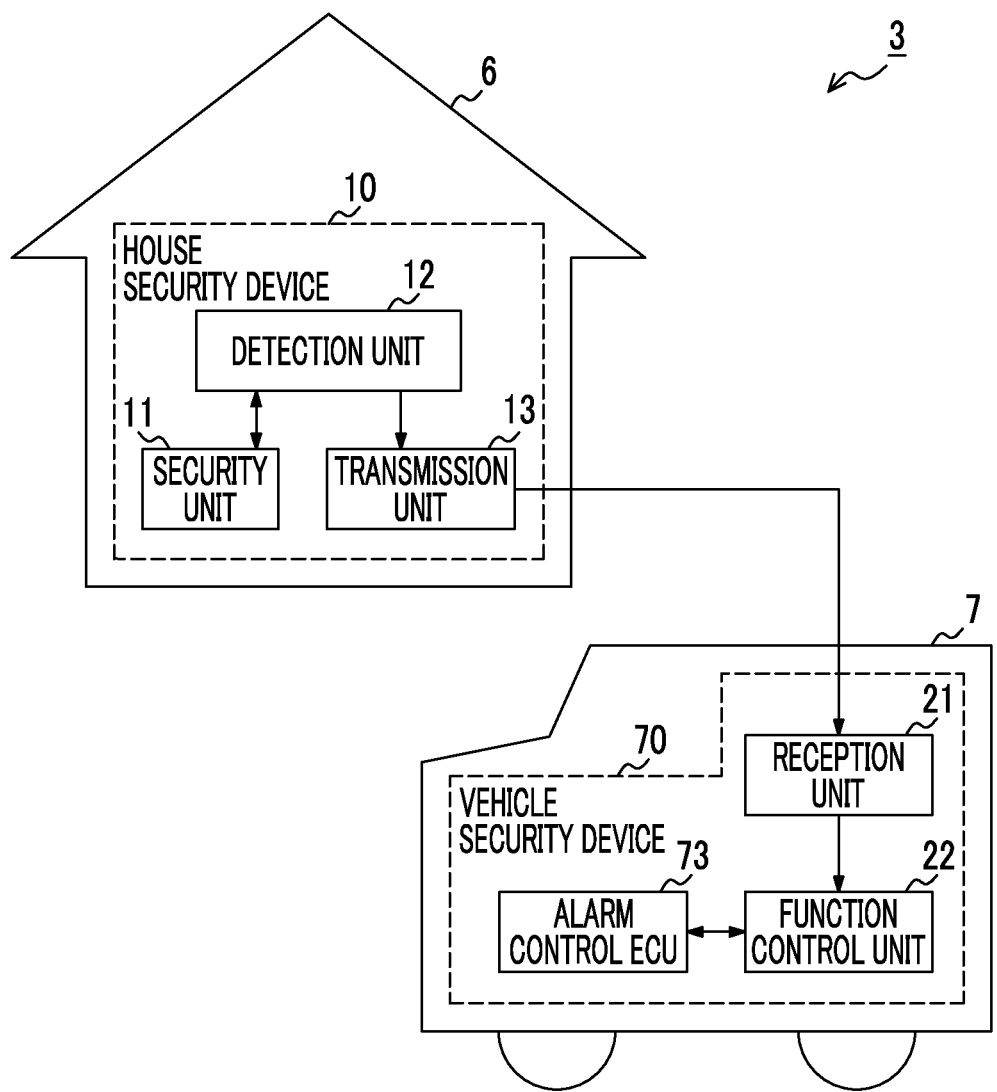
FIG. 7 is a schematic diagram illustrating a configuration of a vehicle antitheft system according to a third embodiment of the disclosure.

A configuration of a vehicle antitheft system according to a third embodiment of the disclosure will be described below. FIG. 7 is a schematic diagram illustrating a configuration of the vehicle antitheft system 3 according to the third embodiment of the disclosure. The vehicle antitheft system 3 illustrated in FIG. 7 includes a house security device 10 and a vehicle security device 70. The vehicle antitheft system 3 according to the third embodiment is different from the vehicle antitheft system 1 according to the first embodiment in the configuration of the vehicle security device 70.

Some or all of the elements that are the same as those of the vehicle antitheft system 1 will not be repeated and the vehicle antitheft system 3 according to the third embodiment will be described below with focus on the vehicle security device 70 which has a different configuration.

The house security device 10 includes a security unit 11, a detection unit 12, and a transmission unit 13, similarly to the vehicle antitheft system 1 according to the first embodiment. A notification indicating that a state change of the security unit 11 is detected by the detection unit 12 (or a notification indicating an abnormality in the house 6) is transmitted from the transmission unit 13 to the vehicle security device 70 (a reception unit 21 of the vehicle security device 70).

The vehicle security device 70 is a device that performs security control of a vehicle 7 and includes a reception unit 21, a function control unit 22, and an alarm control electronic control unit (ECU) 73. The reception unit 21, the function control unit 22, and the alarm control ECU 73 are mounted on the vehicle 7.

The reception unit 21 is, for example, a reception function unit included in a vehicle communication module that communicates with the house security device 10. The reception unit 21 can receive a notification indicating that a state change of the security unit 11 is detected (or a notification indicating an abnormality in the house 6) transmitted from the transmission unit 13 of the house security device 10. When the notification is received from the house security device 10, the reception unit 21 reports to the function control unit 22 connected thereto that the notification is received.

The function control unit 22 can control the alarm control ECU 73 depending on whether the notification indicating that a state change of the security unit 11 is detected (or a notification indicating an abnormality in the house 6) is received from the house security device 10 and can control an antitheft function of the vehicle 7 which is operated by the alarm control ECU 73. The function control unit 22 releases the antitheft function of the vehicle 7 which is performed by the alarm control ECU 73 when the reception unit 21 does not report that the notification is received and a regular vehicle key is used to operate the vehicle. On the other hand, the function control unit 22 prohibits releasing of the antitheft function of the vehicle 7 which is performed by the alarm control ECU 73 when the reception unit 21 reports that the notification is received and a regular vehicle key is used to operate the vehicle.

The alarm control ECU 73 is one electronic control unit mounted on the vehicle 7 and performs an antitheft function of the vehicle 7 of sounding a door alarm using an alarm unit (not illustrated) of the vehicle 7 when the door is locked using a vehicle key by radio communication and then the door is unlocked using a mechanical key via a key cylinder (not illustrated). The antitheft function is normally controlled to activate the door alarm (sound an alarm) even when a regular vehicle key is used normally. Accordingly, a user of the vehicle can arbitrarily change settings such that the door alarm is not activated, that is, the door alarm can be released, even in the above-mentioned case. However, in this embodiment, when the notification is received from the house security device 10, the releasing of the door alarm is prohibited even when releasing of the door alarm of the vehicle 7 is set.

Figure 8:
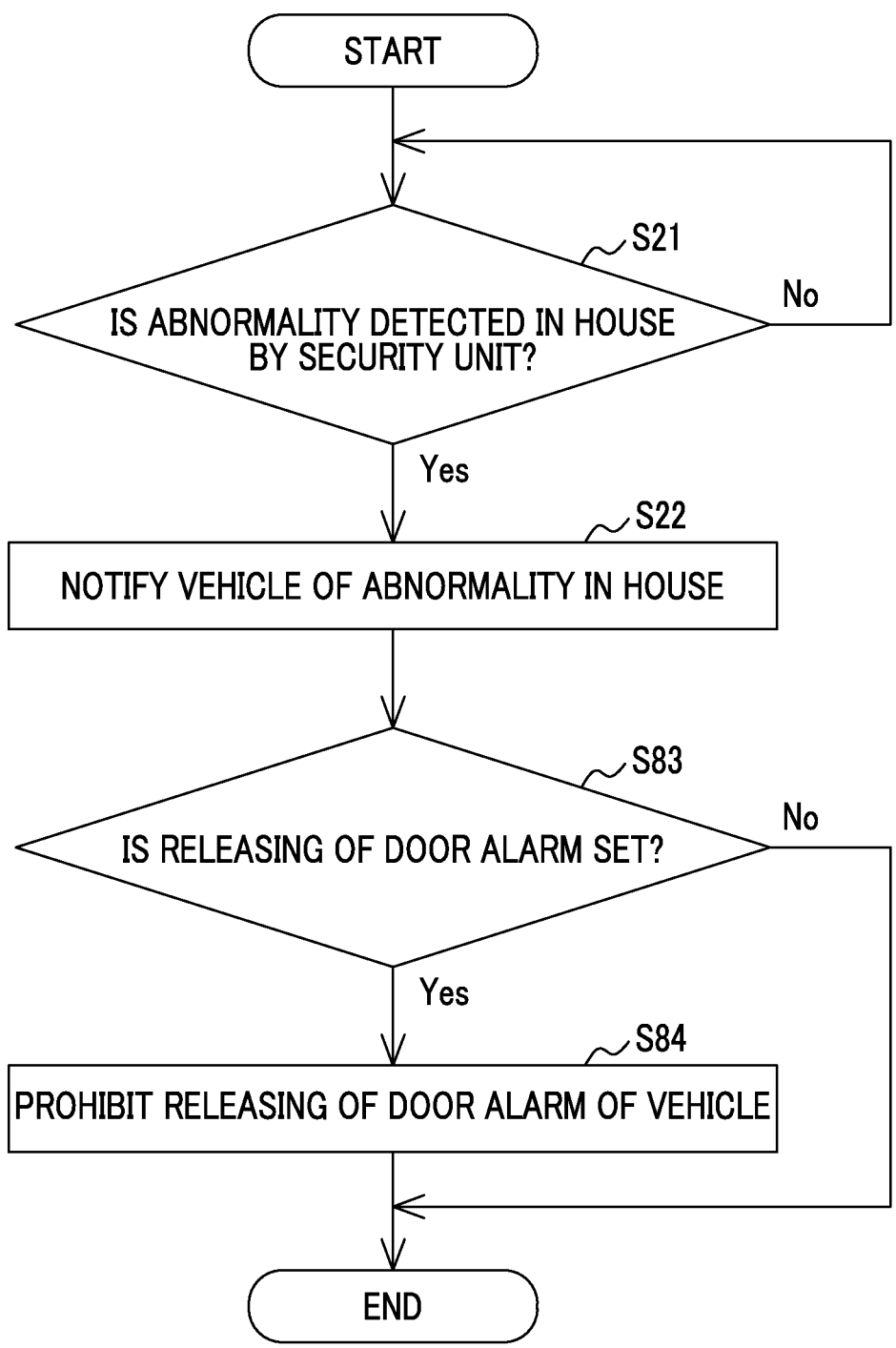
FIG. 8 is a flowchart illustrating a process flow which is performed by the vehicle antitheft system according to the third embodiment.

The vehicle antitheft function which is performed in the vehicle antitheft system 3 according to the third embodiment will be described below with additional reference to FIG. 8. FIG. 8 is a flowchart illustrating a process flow which is performed by the house security device 10 and the vehicle security device 70.

The process flow illustrated in FIG. 8 is started when the house security device 10 is activated such as when a resident leaves or falls asleep.

When the process flow is started, the detection unit 12 of the house security device 10 determines whether a state change of the security unit 11 is detected, that is, whether an abnormality is detected in the house 6 (Step S21). For example, the detection unit 12 determines that there is a possibility of a suspicious person trespassing into the house via the security unit 11 such as a sensor or a camera.

When it is determined in Step S21 that an abnormality is detected in the house 6, the transmission unit 13 of the house security device 10 transmits a notification indicating that an abnormality is detected in the house 6 to the reception unit 21 of the vehicle security device 70 (the vehicle 7) (Step S22).

In the vehicle security device 70 receiving the notification indicating that an abnormality is detected in the house 6, the function control unit 22 determines whether the door alarm which is operated when the door is unlocked using a mechanical key via a key cylinder after the door is locked by radio communication with the vehicle key is set to be released (Step S83).

When it is determined in Step S83 that the door alarm is set to be released, the function control unit 22 of the vehicle security device 70 does not release the door alarm, that is, prohibits releasing of the door alarm, even when the door alarm of the vehicle 7 which is performed by the alarm control ECU 73 is set to be released (Step S84).

Operations and advantages in the third embodiment will be described below. In the vehicle antitheft system 3 according to the third embodiment, the house security device 10 installed in the house 6 and the vehicle security device 70 mounted on the vehicle 7 are configured to communicate with each other. When the state change of the security unit 11 such as a sensor is detected in the house security device 10, that is, when an abnormality is detected in the house 6, the notification indicating that the abnormality is detected is transmitted to the vehicle security device 70. The vehicle security device 70 receiving the notification prohibits releasing of the antitheft function of the vehicle 7 which is normally released when a regular vehicle key is used to operate the vehicle.

Through this process flow, for example, even when a trespassing suspicious person takes a regular vehicle key located in the house 6 and tries to steal the vehicle 7 parked in a garage or the like using the taken regular vehicle key, the releasing of the antitheft function of the vehicle 7 is prohibited by the notification previously received from the house 6. Particularly, in the third embodiment, the releasing of the door alarm is prohibited to necessarily activate the door alarm and to sound an alarm when the door is unlocked using a mechanical key by inserting a regular vehicle key into a key cylinder of the vehicle 7.

Accordingly, even in a situation in which a regular vehicle key located in a house 6 is taken by a trespassing suspicious person or the like, it is possible to decrease the possibility of theft of the vehicle 7 by the suspicious person using the taken regular vehicle key.

The alarm control ECU 73 in the vehicle antitheft system 3 according to the third embodiment may be incorporated into the door lock control ECU 43 in the vehicle antitheft system 2 according to the second embodiment.

Fourth Embodiment

Figure 9:
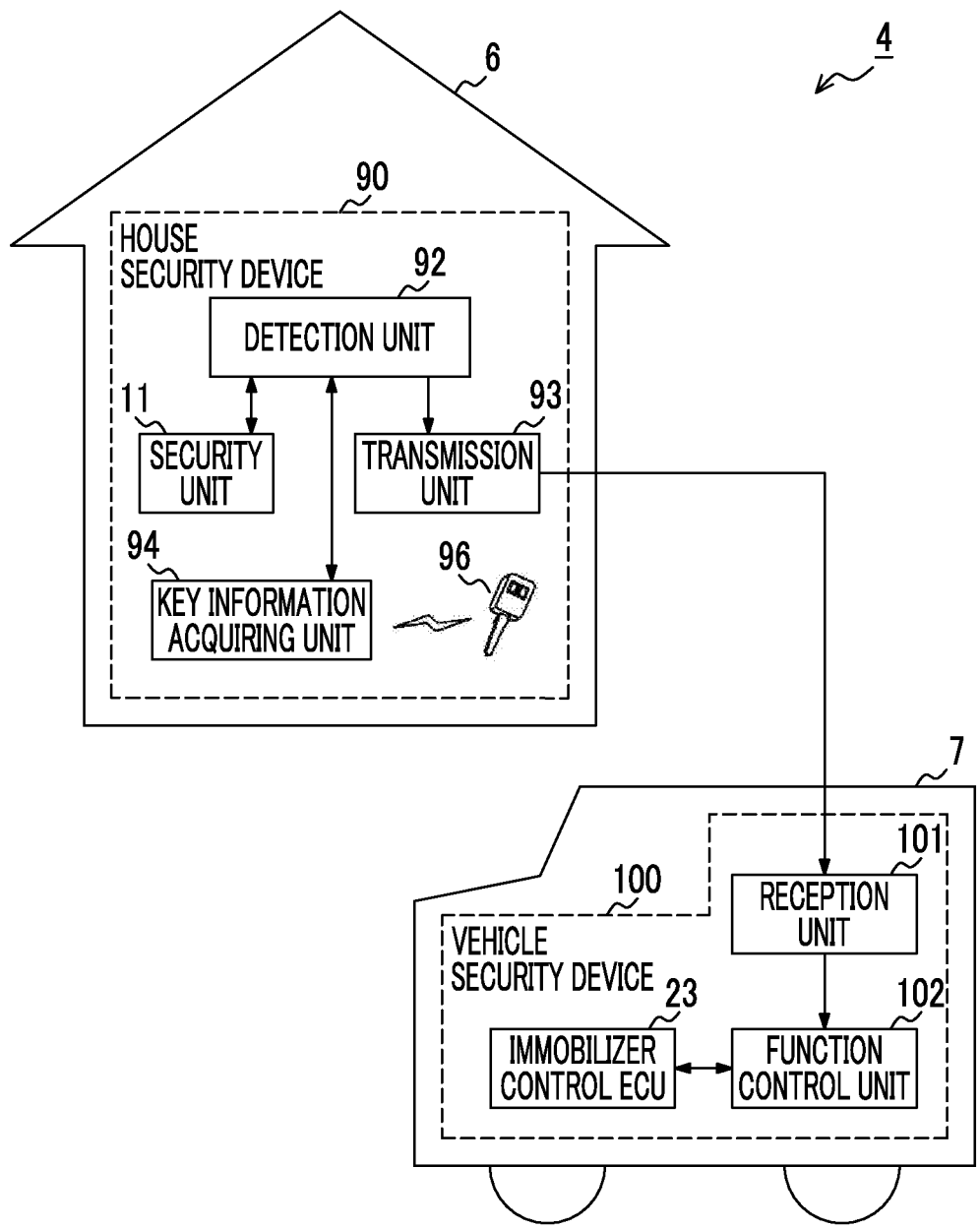
FIG. 9 is a schematic diagram illustrating a configuration of a vehicle antitheft system according to a fourth embodiment of the disclosure.

A configuration of a vehicle antitheft system according to a fourth embodiment of the disclosure will be described below. FIG. 9 is a schematic diagram illustrating a configuration of the vehicle antitheft system 4 according to the fourth embodiment of the disclosure. The vehicle antitheft system 4 illustrated in FIG. 9 includes a house security device 90 and a vehicle security device 100.

The house security device 90 is a device that performs security control of a house 6 and includes a security unit 11, a detection unit 92, a transmission unit 93, and a key information acquiring unit (acquisition unit) 94. The security unit 11, the detection unit 92, the transmission unit 93, and the key information acquiring unit 94 are installed in the house 6. The house 6 in this embodiment includes the concept of a site or the like managed by an owner as well as that of a simple residential building.

The security unit 11 is a sensor unit that acquires or the like a condition or state of a predetermined place or household appliance. Examples of the sensor unit include a passive sensor, a radar sensor, or an infrared camera for detecting a trespasser on the site or the building and an opening sensor, a glass breakage sensor, or a pressure sensor for detecting opening or breakage of a window or a door. The number of security units 11 in the house security device 90 may be one, or two or more.

The detection unit 92 is an example of a detection functional unit included in a house control module that comprehensively performs security control which is performed by the house security device 90. The detection unit 92 is connected to the security unit 11 and can successively receive information on the condition or state from the security unit 11. The detection unit 92 detects that a predetermined change occurs in the condition or state of the security unit 11 on the basis of one or more pieces of information received from the security unit 11. The predetermined change can be arbitrarily determined. For example, the predetermined change may be a change indicating an abnormality in the house 6 in which it can be determined that a suspicious person is trespassing or there is concern that a suspicious person may be trespassing.

The detection unit 92 is connected to the key information acquiring unit 94, and can instruct the key information acquiring unit 94 to acquire information on a regular vehicle key (to be described later) in the house 6 from the key information acquiring unit 94 when a predetermined change of a condition or state of the security unit 11 is detected (a state change of the security unit 11 is detected).

The detection unit 92 outputs the result indicating that the state change of the security unit 11 is detected and the acquired information on the regular vehicle key to the transmission unit 93 when the state change of the security unit 11 is detected and the information on the regular vehicle key (to be described later) in the house 6 is acquired from the key information acquiring unit 94.

The key information acquiring unit 94 can transmit a request signal (radio waves) to the house 6 in response to an instruction from the detection unit 92 and can receive a response signal returned from a regular vehicle key 96 having received the request signal. The response signal returned from the vehicle key 96 includes specific identification information (for example, an identification number) of the vehicle key 96. When the response signal is received from the vehicle key 96, the key information acquiring unit 94 outputs the identification information included in the response signal to the detection unit 92. An area in which the request signal is transmitted from the key information acquiring unit 94 has only to include at least the house 6 and the range or shape thereof is not particularly limited.

The transmission unit 93 is, an example of a transmission functional unit included in a house communication module that communicates with the vehicle security device 100 (the reception unit 101 of the vehicle security device 100). The transmission unit 93 is connected to the detection unit 92 and can receive the result indicating that the state change of the security unit 11 is detected and the specific identification information of the regular vehicle key in the house 6 from the detection unit 92. When the result and the specific identification information are received from the detection unit 92, the transmission unit 93 transmits a notification indicating that the state change of the security unit 11 is detected (or a notification indicating an abnormality in the house 6) along with the specific identification information of the regular vehicle key in the house 6 to the vehicle security device 100 (the reception unit 101 of the vehicle security device 100). For example, a known radio communication technique having short signal coverage can be used for the communication between the transmission unit 93 of the house security device 90 and the reception unit 101 of the vehicle security device 100.

The vehicle security device 100 is a device that performs security control of a vehicle 7 and includes a reception unit 101, a function control unit 102, and an immobilizer ECU 23. The reception unit 101, the function control unit 102, and the immobilizer control ECU 23 are mounted on the vehicle 7.

The reception unit 101 is, for example, a reception function unit included in a vehicle communication module that communicates with the house security device 90. The reception unit 101 can receive the notification indicating that a state change of the security unit 11 is detected (or a notification indicating an abnormality in the house 6) and the specific identification information of the regular vehicle key in the house 6 transmitted from the transmission unit 93 of the house security device 90. When the notification and the identification information are received from the house security device 90, the reception unit 101 reports to the function control unit 102 connected thereto that the notification and the identification information are received.

The function control unit 102 can control the immobilizer control ECU 23 depending on whether the notification indicating that a state change of the security unit 11 is detected (or a notification indicating an abnormality in the house 6) and the specific identification information of the regular vehicle key in the house 6 are received from the house security device 90 and can control an antitheft function of the vehicle 7 which is operated by the immobilizer control ECU 23. The function control unit 102 releases the antitheft function of the vehicle 7 which is performed by the immobilizer control ECU 23 when the reception unit 101 does not report that the notification and the identification information are received and a regular vehicle key is used to operate the vehicle. On the other hand, the function control unit 102 prohibits releasing of the antitheft function of the vehicle 7 which is performed by the immobilizer control ECU 23 when the reception unit 101 reports that the notification and the identification information are received and identification information of a vehicle key used to operate the vehicle matches the identification information added to the notification.

The immobilizer control ECU 23 is one electronic control unit mounted on the vehicle 7 and performs an antitheft function of the vehicle 7 of prohibiting starting of an engine (not illustrated) of the vehicle 7 unless a regular vehicle key is used to operate the vehicle. The antitheft function normally releases a state in which the engine of the vehicle 7 cannot be started to a state in which the engine can be started when a regular vehicle key is used to operate the vehicle by radio communication. However, in this embodiment, when the notification and the identification information are received from the house security device 90 and identification information of the vehicle key used to operate the vehicle matches the identification information, the vehicle security device 100 prohibits releasing of the state in which the engine of the vehicle 7 cannot be started even when a regular vehicle key is used to operate the vehicle by radio communication.

Figure 10:
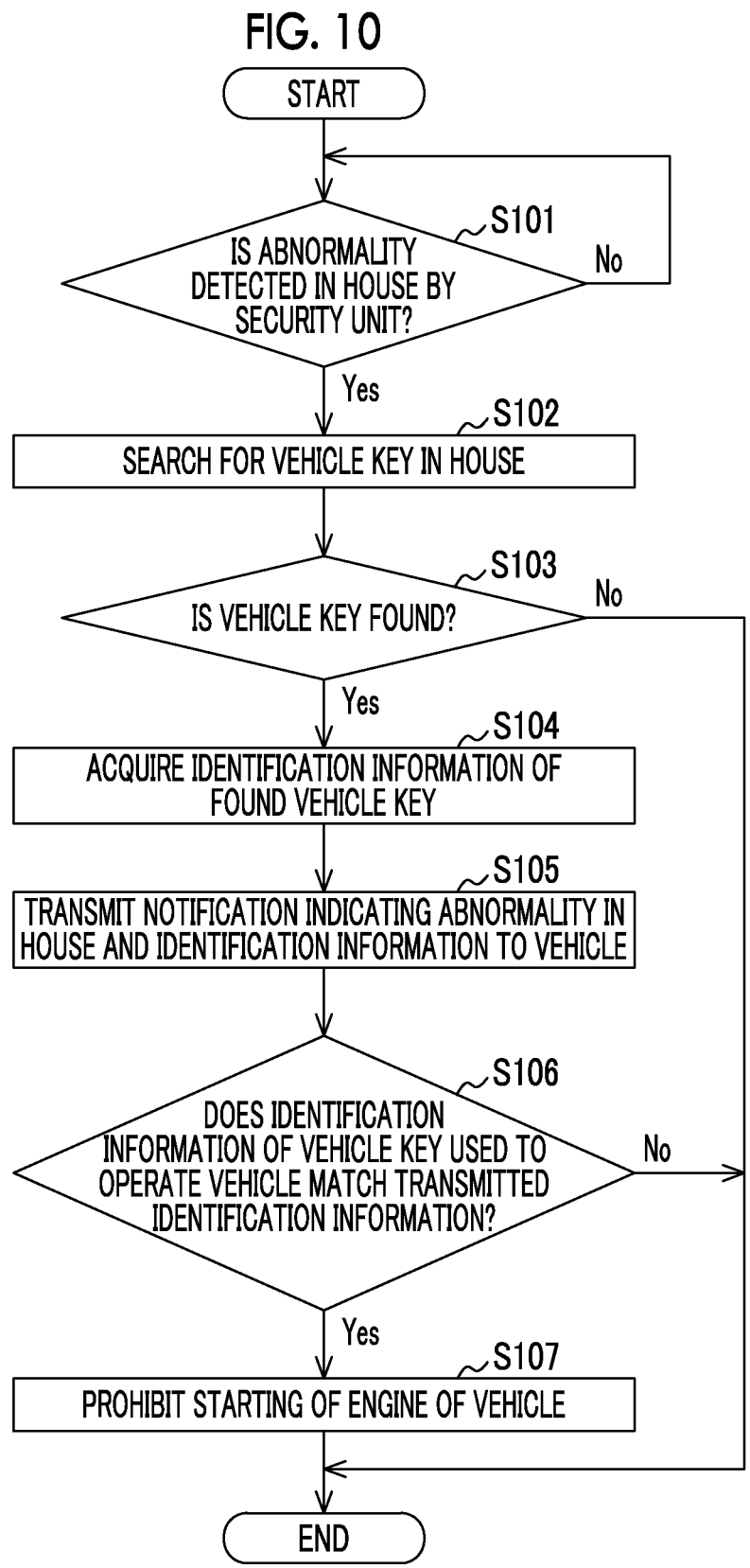
FIG. 10 is a flowchart illustrating a process flow which is performed by the vehicle antitheft system according to the fourth embodiment.

The vehicle antitheft function which is performed in the vehicle antitheft system 4 according to the fourth embodiment of the disclosure will be described below with reference to FIG. 10. FIG. 10 is a flowchart illustrating a process flow which is performed by the house security device 90 and the vehicle security device 100.

The process flow illustrated in FIG. 10 is started when the house security device 90 is activated such as when a resident leaves or falls asleep.

When the process flow is started, the detection unit 92 of the house security device 90 determines whether a state change of the security unit 11 is detected, that is, whether an abnormality is detected in the house 6 (Step S101). For example, the detection unit 92 determines that there is a possibility of a suspicious person trespassing into the house via the security unit 11 such as a sensor or a camera.

When it is determined in Step S101 that an abnormality is detected in the house 6, the key information acquiring unit 94 performs searching to check whether a regular vehicle key is in the house 6 in accordance with an instruction from the detection unit 92 (Step S102).

When there is no regular vehicle key is found in the house 6 in Step S102 (NO in Step S103), the process flow ends. On the other hand, when a regular vehicle key 96 is found in the house 6 in Step S102 (YES in Step S103), specific identification information is acquired from the found regular vehicle key 96 (Step S104).

When the identification information of the regular vehicle key 96 found in the house 6 is acquired in Step S104, the notification indicating that an abnormality is detected in the house 6 along with the identification information of the regular vehicle key 96 found in the house 6 is transmitted from the transmission unit 93 of the house security device 90 to the reception unit 101 of the vehicle security device 100 (Step S105).

In the vehicle security device 100 (the vehicle 7) receiving the notification indicating that an abnormality is detected in the house 6 and the identification information of the regular vehicle key 96 found in the house 6, when a vehicle key is used to operate the vehicle after the notification and the identification information are received, it is determined whether the identification information of the vehicle key matches the identification information of the regular vehicle key 96 found in the house 6 notified of by the house security device 90 (Step S106).

When it is determined in Step S106 that the identification information of the vehicle key used to operate the vehicle matches the identification information of the regular vehicle key transmitted from the house security device 90, the function control unit 102 of the vehicle security device 100 does not release a state in which the engine of the vehicle 7 cannot be started, that is, prohibits starting of the engine, even when a regular vehicle key is used to operate the vehicle by radio communication, this action being performed by the immobilizer control ECU 23 (Step S107).

Operations and advantages in the fourth embodiment will be described below. In the vehicle antitheft system 4 according to the fourth embodiment, the house security device 90 installed in the house 6 and the vehicle security device 100 mounted on the vehicle 7 are configured to communicate with each other. When the state change of the security unit 11 such as a sensor is detected in the house security device 90, that is, when an abnormality is detected in the house 6, a notification indicating that an abnormality is detected in the house is transmitted to the vehicle security device 100 along with the identification information of the regular vehicle key 96 in the house 6. The vehicle security device 100 having received the notification prohibits releasing of the antitheft function of the vehicle 7 which is normally released when the regular vehicle key is used to operate the vehicle only when the identification information matches. That is, in the vehicle antitheft system 4 according to this embodiment, releasing of the antitheft function is permitted for a vehicle key of which the identification information does not match, and releasing of the antitheft function is prohibited for a vehicle key of which the identification information matches. Accordingly, it can be said to restrict releasing of the antitheft function of the vehicle 7.

Through this process flow, for example, even when a trespassing suspicious person takes a regular vehicle key 96 located in the house 6 and tries to steal the vehicle 7 parked in a garage or the like using the taken regular vehicle key 96, the releasing of the antitheft function of the vehicle 7 is prohibited by the notification previously received from the house 6. Particularly, in the fourth embodiment, the releasing of the engine start prohibited state in which the engine cannot be started is prohibited to control the engine of the vehicle 7 not to be started only when the taken regular vehicle key 96 is used to operate the vehicle.

Accordingly, in a situation in which a regular vehicle key 96 located in a house 6 is taken by a trespassing suspicious person or the like, it is possible to decrease the possibility of theft of the vehicle 7 by the suspicious person using the taken regular vehicle key 96 while permitting operation of the vehicle using a regular vehicle key other than the taken regular vehicle key.

In the fourth embodiment, the immobilizer control ECU 23 described in the first embodiment is used as a target to be controlled by the function control unit 102. However, the target to be controlled by the function control unit 102 may be the door lock control ECU 43 described in the second embodiment or the alarm control ECU 73 described in the third embodiment in addition to the immobilizer control ECU 23.

The process of Step S107 in the flowchart illustrated in FIG. 10 may be replaced with the processes of Steps S33 to S35 (FIG. 3), the process of Step S53 (FIG. 5), the processes of Steps S63 to S65 (FIG. 6), or the process of Steps S83 to S84 (FIG. 8).

Figure 11:
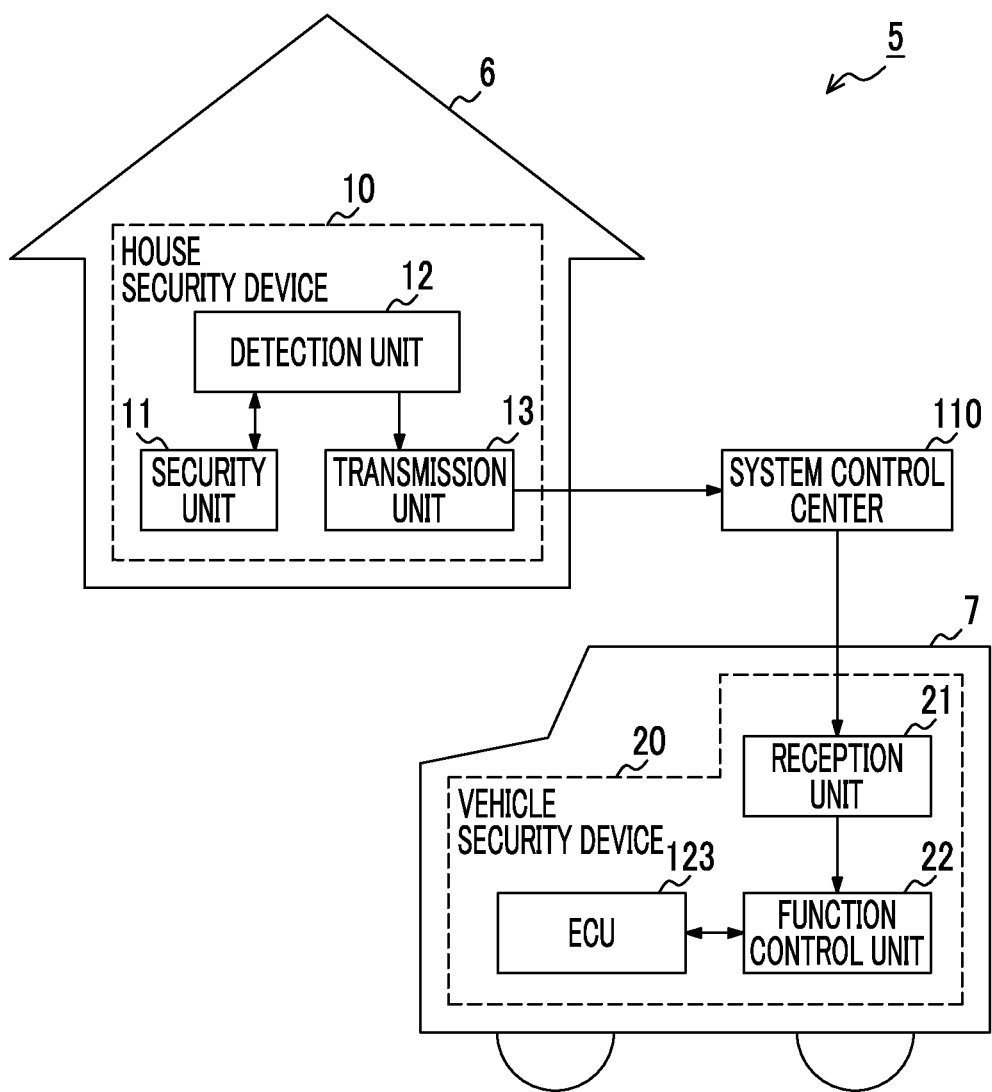
FIG. 11 is a schematic diagram illustrating a configuration of a vehicle antitheft system according to another embodiment of the disclosure.

Another embodiment will be described below. FIG. 11 is a schematic diagram illustrating a configuration of a vehicle antitheft system 5 according to another embodiment of the disclosure. The vehicle antitheft system 5 illustrated in FIG. 11 is different from the vehicle antitheft systems 1 to 3 according to the first to third embodiments in that a system control center 110 is interposed between the house security device 10 and the vehicle security device 20.

In the vehicle antitheft system 5, when a result indicating that a state change of the security unit 11 is detected is input from the detection unit 12, the transmission unit 13 transmits a notification indicating that a state change of the security unit 11 is detected (or a notification indicating that an abnormality is detected in the house 6) to the system control center 110.

When the notification indicating that a state change of the security unit 11 is detected (or the notification indicating that an abnormality is detected in the house 6) is received from the transmission unit 13 of the house security device 10, the system control center 110 transmits the notification to the reception unit 21 of the vehicle security device 20. That is, the system control center 110 serves as a relay unit that relays communication between the transmission unit 13 of the house security device 10 and the reception unit 21 of the vehicle security device 20. A known communication technique such as the Internet can be used for the communication between the transmission unit 13 of the house security device 10 and the system control center 110.

The system control center 110 may be configured to be included in the house security device 10 or may be configured to be included in the vehicle security device 20. In the former, the transmission unit 13 and the system control center 110 serve as the "transmission unit". In the latter, the system control center 110 and the reception unit 21 serve as the "reception unit".

The system control center 110 may transmit the notification received from the transmission unit 13 of the house security device 10 to the reception unit 21 of the vehicle security device 20 without any change or may process the notification or change the notification to another notification and transmit the resultant notification to the reception unit 21 of the vehicle security device 20.

When the notification transmitted from the system control center 110 is received, the reception unit 21 of the vehicle security device 20 reports to the function control unit 22 that a state change of the security unit 11 is detected in the house security device 10. A known communication technique such as the Internet can be used for the communication between the system control center 110 and the reception unit 21 of the vehicle security device 20.

The function control unit 22 receiving the notification from the reception unit 21 controls an electronic control unit (ECU) 123 to prohibit releasing of the antitheft function of the vehicle 7 which is performed by the ECU 123. As the ECU 123, an antitheft functional unit such as the immobilizer control ECU 23, the door lock control ECU 43, and the alarm control ECU 73, which were described in the first to third embodiments, are used.

Operations and advantages of this embodiment will be described below. In the vehicle antitheft system 5 according to this embodiment, the communication between the transmission unit 13 of the house security device 10 and the reception unit 21 of the vehicle security device 20 can be carried out via the system control center 110. Accordingly, even when the vehicle 7 is far from the house 6 in which the state change of the security unit 11 is detected, it is possible to prohibit releasing of the antitheft function of the vehicle 7.

In the vehicle antitheft system 5 according to this embodiment, the system control center 110 can add information or control useful for security to the notification received from the house security device 10 and then transmit the resultant notification to the vehicle security device 20. Accordingly, further improvement of the antitheft function of the vehicle 7 can be expected.

In the vehicle antitheft system 5 according to this embodiment, the configuration of the house security device 10 may be replaced with the house security device 90 described in the fourth embodiment. In this case, for example, when an owner uses the vehicle 7 in far away from the house 6 and a suspicious person takes a regular vehicle key in the house 6, the owner can drive the vehicle 7 back to the house.

In the above-mentioned embodiments, when the vehicle or the vehicle security device includes a Global Positioning System (GPS) receiver, it may prohibit releasing of the antitheft function only in a case in which the vehicle is in a predetermined place. An example of the case in which the vehicle is in a predetermined place is a case in which the vehicle is parked in front of the house.

In the above-mentioned embodiments, in the vehicle security device, a warning for preventing theft may be displayed close to a meter of an instrument panel in addition to releasing prohibition control for the immobilizer control ECU, the door lock control ECU, or the alarm control ECU. Through this display, it is possible to further improve an antitheft capability.

In the above-mentioned embodiments, the house security device takes a measure of prohibiting releasing of the antitheft function of the vehicle when an abnormality is detected in the house is, but it may take a measure of invalidating the regular vehicle key in the house.

In the above-mentioned embodiments, the house security device takes a measure of prohibiting releasing of the antitheft function by transmitting a notification to the vehicle when an abnormality is detected in the house, but it may transmit the notification to a device other than the vehicle as a measure against taking an object other than the vehicle key. For example, the notification may be transmitted to a credit card company as a measure against taking a credit card, the notification may be transmitted to a security company as a measure against taking a house key, the notification may be transmitted to a communication company as a measure against taking a mobile terminal, or the notification may be transmitted to a bank as a measure against taking a seal impression or a bankbook.

The vehicle antitheft system according to the disclosure can be usefully used when it is intended to decrease the possibility of theft of a vehicle by coordinating security of a house and security of a vehicle.

What is claimed is:

1. A vehicle antitheft system comprising:
   a house security device including
      a detection unit configured to detect an event triggering an alarm of a predetermined security unit installed in a house, and
      a transmission unit configured to transmit a notification indicating that the triggering event has occurred when the triggering event is detected by the detection unit; and
   a vehicle security device including
      a reception unit configured to receive the notification transmitted from the transmission unit of the house security device, and
      a function control unit configured to control a vehicle antitheft function depending on whether the notification is received by the reception unit,
   wherein the function control unit is configured to allow use of a regular vehicle key to start the vehicle or unlock the vehicle in response to the function control unit not receiving the notification from the reception unit, and
   wherein the function control unit is further configured to prohibit use of the regular vehicle key to start the vehicle or unlock the vehicle directly in response to the detection unit of the house security device detecting that the event triggering the alarm has occurred based on receiving the notification at the function control unit of the vehicle security device.

2. The vehicle antitheft system according to claim 1, wherein the vehicle antitheft function is a function of prohibiting starting of a vehicle engine.

3. The vehicle antitheft system according to claim 1, wherein the vehicle antitheft function is a function of prohibiting unlocking of a vehicle door by radio communication.

4. The vehicle antitheft system according to claim 1, wherein the vehicle antitheft function is a function of sounding an alarm when a vehicle door is unlocked using a mechanical key.

5. The vehicle antitheft system according to claim 1, wherein
   the house security device further includes an acquisition unit configured to perform searching to find a regular vehicle key located in the house and to acquire identification information of the regular vehicle key when the state change of the predetermined security unit is detected by the detection unit,
   the transmission unit is configured to add the identification information of the regular vehicle key acquired by the acquisition unit to the notification and to transmit the notification to the vehicle security device, and
   the function control unit is configured to prohibit releasing of the vehicle antitheft function when the notification is received by the reception unit and identification information of a vehicle key used to operate the vehicle matches the identification information included in the notification.

6. The vehicle antitheft system according to claim 1, wherein the transmission unit and the reception unit are configured to directly transmit and receive the notification.

7. The vehicle antitheft system according to claim 1, wherein the transmission unit and the reception unit are configured to transmit and receive the notification via a system control center interposed between the house security device and the vehicle security device.

8. The vehicle antitheft system according to claim 1, wherein the function control unit is configured to prohibit use of the regular vehicle key to start the vehicle or unlock the vehicle when the vehicle is in a predetermined place.

9. A vehicle security device that prevents theft of a vehicle based on a notification received from a house security device, the vehicle security device comprising:
- a reception unit configured to receive the notification indicating that an event triggering an alarm of a predetermined security unit installed in a house is detected from the house security device; and
- a function control unit configured to control a vehicle antitheft function depending on whether the notification is received by the reception unit,
- wherein the function control unit is configured to allow use of a regular vehicle key to start the vehicle or unlock the vehicle in response to the function control unit not receiving the notification from the reception unit, and
- wherein the function control unit is further configured to prohibit use of the regular vehicle key to start the vehicle or unlock the vehicle directly in response to the detection unit of the house security device detecting that the event triggering the alarm has occurred based on receiving the notification at the function control unit of the vehicle security device.

10. A vehicle antitheft system comprising:
a house security device including
- a detection unit comprising a processor configured to detect a state change of a predetermined security unit installed in a house, and
- a transmission unit comprising a transmitter configured to transmit a notification indicating that the state change is detected when the state change of the predetermined security unit is detected by the detection unit; and a vehicle security device including
- a reception unit comprising a receiver configured to receive the notification transmitted from the transmission unit of the house security device, and
- a function control unit comprising a controller configured to control a vehicle antitheft function depending on whether the notification is received by the reception unit, wherein
the function control unit is configured to release the vehicle antitheft function when the notification is not received by the reception unit and a regular vehicle key is used to operate a vehicle, and to restrict releasing of the vehicle antitheft function when the notification is received by the reception unit and the regular vehicle key is used to operate the vehicle,
the house security device is configured to perform searching to find a regular vehicle key located in the house and to acquire identification information of the regular vehicle key when the state change of the predetermined security unit is detected by the detection unit,
the transmission unit is configured to add the identification information of the regular vehicle key to the notification and to transmit the notification to the vehicle security device, and
the function control unit is configured to prohibit releasing of the vehicle antitheft function when the notification is received by the reception unit and identification information of a vehicle key used to operate the vehicle matches the identification information included in the notification.

* * * * *